June 8, 1943.    E. W. BERNHARDT    2,321,274
GIN SAW SHARPENING MACHINE
Filed Jan. 22, 1941    3 Sheets-Sheet 1

Inventor
E. W. Bernhardt
By Mason Fenwick & Lawrence
Attorneys

June 8, 1943.  E. W. BERNHARDT  2,321,274
GIN SAW SHARPENING MACHINE
Filed Jan. 22, 1941  3 Sheets-Sheet 2

Inventor
E. W. Bernhardt
By Mason Fenwick & Lawrence
Attorneys

June 8, 1943.   E. W. BERNHARDT   2,321,274
GIN SAW SHARPENING MACHINE
Filed Jan. 22, 1941   3 Sheets-Sheet 3
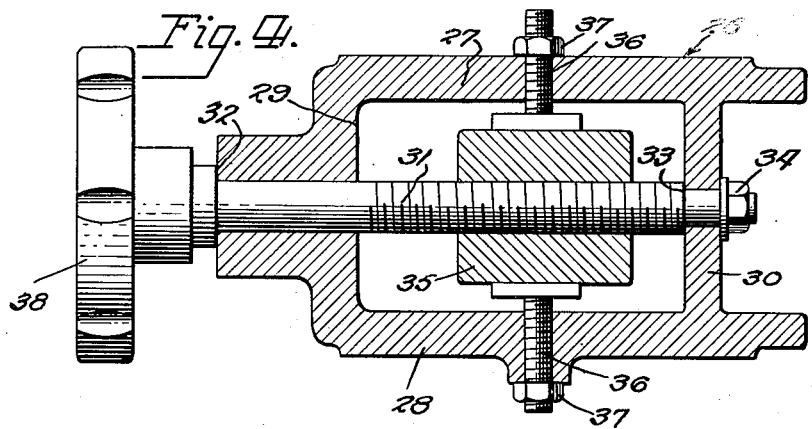
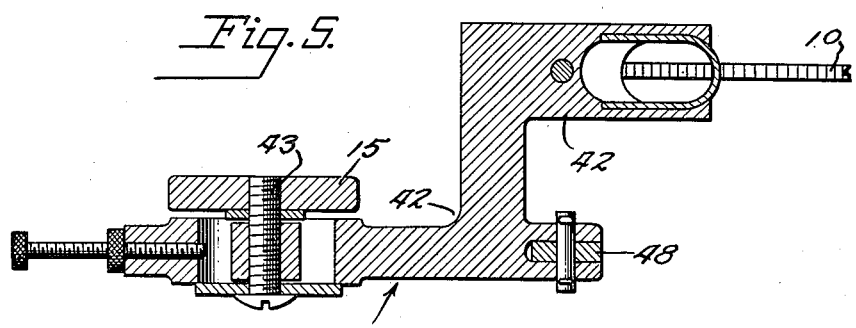
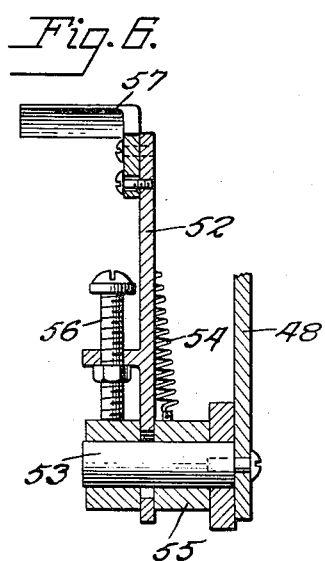
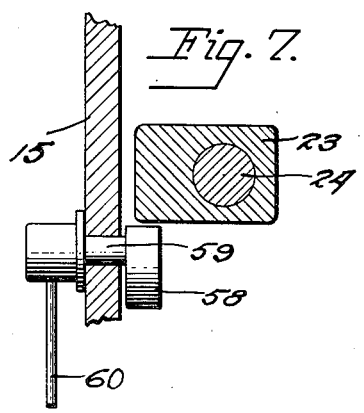
Inventor
E. W. Bernhardt
By Mason Fenwick & Lawrence
Attorneys Patented June 8, 1943

2,321,274

UNITED STATES PATENT OFFICE 2,321,274

GIN SAW SHARPENING MACHINE

Ernest W. Bernhardt, Atlanta, Ga., assignor to The A. A. Wood & Sons Company, Atlanta, Ga., a corporation of Georgia Application January 22, 1941, Serial No. 375,498

3 Claims. (Cl. 76—32)

This invention relates to gin saw sharpening machines, and is an improvement upon the inventions disclosed in Patent No. 1,203,443, granted to Albert A. Wood on October 31, 1916, and Patent No. 2,085,350, granted to Albert A. Wood, et al., on June 29, 1937.

One of the objects of the present invention is to provide a gin saw gummer of that type which is adapted to be placed in operative relation with a gin saw cylinder having the usual gang of saws and shifted from one saw to another, embodying simple means for adjusting the machine to its proper cutting position regardless of the diameter of the spacing blocks which support the gummer or the diameter of the saws, such adjustment being made without tools and while the machine is in position upon the saw cylinder.

Another object of the invention is to provide a saw gummer having an auxiliary feed operating synchronously with the main feed to ensure rotation of the saws in the event of broken teeth on the saw.

A further object of the invention is the provision of improved means to lift the gummer file out of operation and to hold it lifted.

The invention further provides for the combining of a gummer file, beveling side files and bur removing side files in one machine, each operating upon a different saw so that each of the files will complete its operation upon its saw without overlapping in one revolution of the saws.

Other objects of the invention will appear as the following description of the preferred embodiment of the invention proceeds.

In the drawings:

Figure 4 is a section through the adjusting means, taken on the line 4—4 of Figure 2;

Figure 5 is a section through the main feed, taken on the line 5—5 of Figure 2;

Figure 6 is a section through the auxiliary feed, taken on the line 6—6 of Figure 2; and Figure 7 is a sectional view illustrating the manual means for lifting the gummer file and is taken on the line 7—7 of Figure 1.

Figure 1:
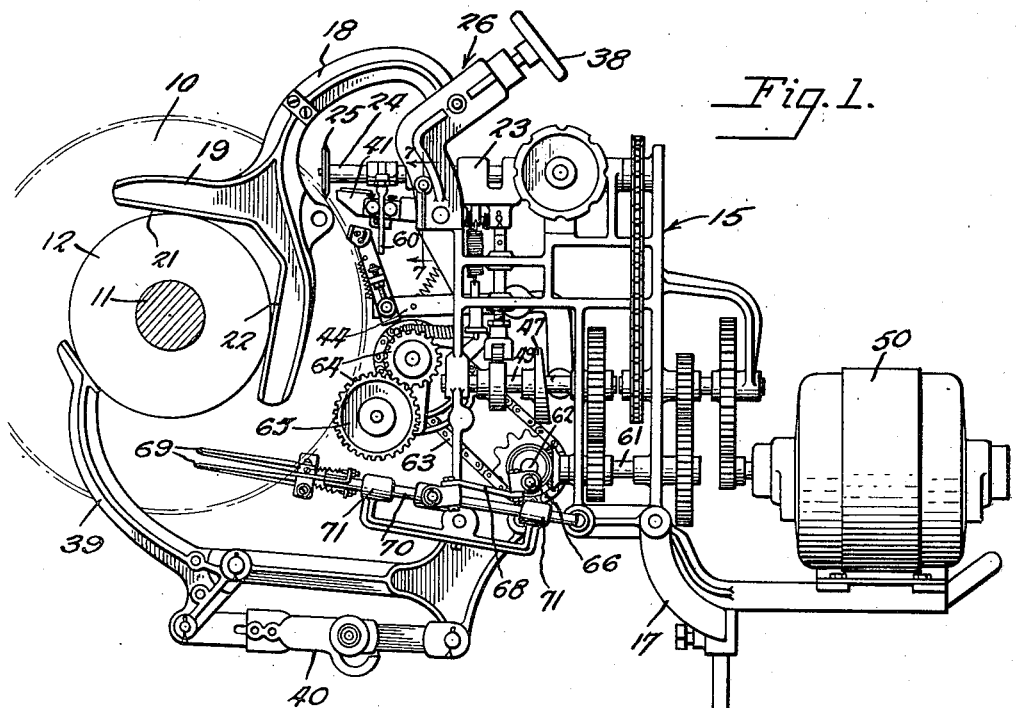
Figure 1 is a side elevation of a saw gummer embodying the principles of the present invention.
Figure 3:
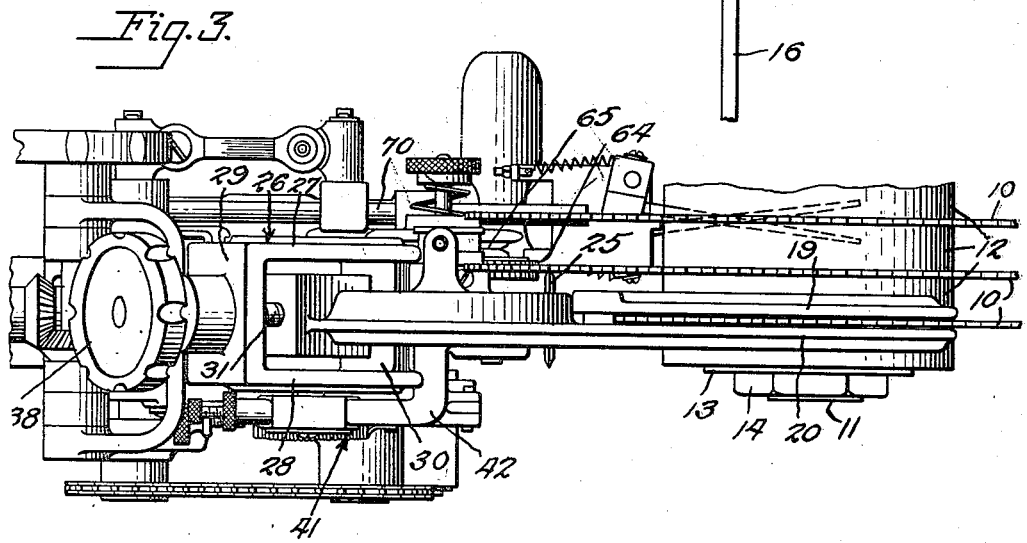
Figure 3 is a top plan view of a portion of the machine.
Figure 2:
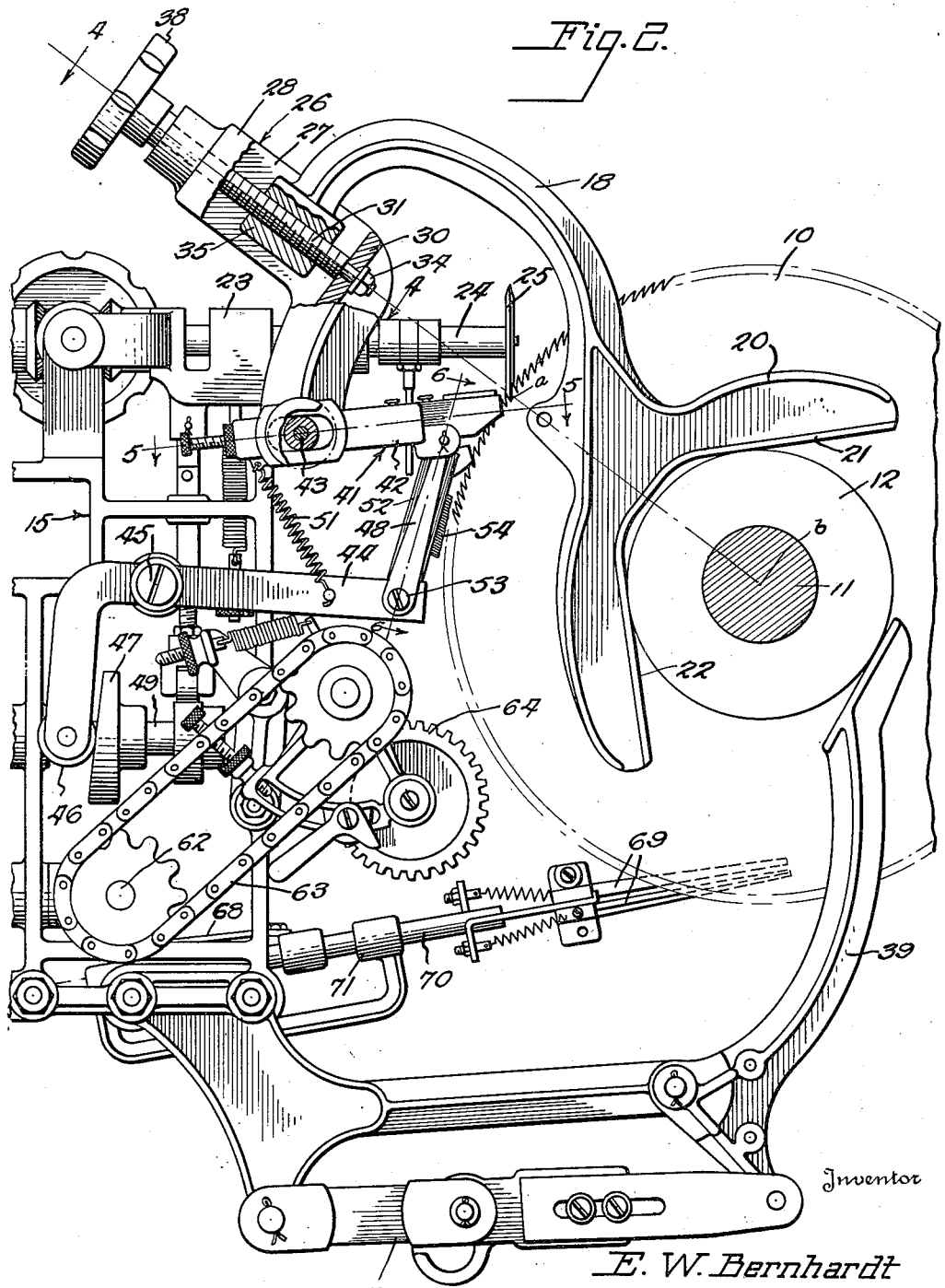
Figure 2 is a side elevation on an enlarged scale and viewed from the opposite side of a portion of the gummer, parts being shown in section.

Referring now in detail to the several figures, the improved gin saw gummer forming the subject matter of this application is designed to be used on a conventional gin saw unit such as is illustrated in Figure 3, in which the gin saws 10 are mounted in parallel relation on an arbor 11, spaced apart by the space blocks 12 and the assemblage held in tight, rigid relation upon the arbor by the end plate 13 against which the nut 14 is tightly screwed.

The gummer comprises a main frame 15 upon which are mounted the various mechanisms of the machine. A great portion of the weight of the gummer is carried by a leg 16 which is held by a set screw in a bracket 17 pivotally connected to the lower portion of the frame. The remainder of the weight has a hooked or arched upper end and a forked lower end, said forked end being carried by a yoke 18 which is bifurcated as at 19 and 20 to straddle a saw, and said forked end providing bearing arms 21 and 22 resting upon the space block 12 between the saws.

A mounting 23 is pivotally attached to the frame 15 and has bearings in which is journalled the rotatable shaft 24 for the gummer file 25 which grinds and shapes the interdental spaces of the saw, and means to be later described are employed to rotate the saw step by step to bring successive teeth into grinding relation with the gummer file.

Various means have been employed in the past to ensure proper setting of the gummer file with relation to the saw to determine the depth of cut of the file. In the aforementioned patent to Wood, et al., No. 2,085,350, a saw gummer was disclosed in which plates were secured to the bottom of the bifurcated yoke by means of screws, variations in the distance of the file from the axis of the saw being obtained by removing the screws and shifting the plates until other holes in the plates registered with matching holes in the yoke, and inserting the screws. This construction provided for considerable adjustment but relied somewhat upon a hit or miss system to properly seat the machine upon the saws. Due to the fact that the plates were within the periphery of the saw cylinder, it was necessary to remove the machine from the saw, make an adjustment, and again place the machine in position. Also, it was impossible to make any adjustment except as provided for in the set series of holes in the plates and yoke.

The invention of the present application provides means to adjust the machine located outside the periphery of the saw cylinder whereby the gummer may be placed upon the saw and adjusted to properly seat the machine and determine the depth of cut of the file.

To accomplish this the frame 15 is provided with an extension 26, substantially U-shaped, having side walls 27 and 28, rear end wall 29 and a front bridge piece 30. This frame extension overhangs the mounting 23 and is disposed at the top of the frame 15 and projects at an oblique inward and downward angle of inclination with respect to the vertical plane of the frame 15. Journalled in the end wall 29 and the bridge piece 30 is a screwthreaded rod 31 held against longitudinal movement by the shoulders 32 and 33 and the nut 34. The upper end of the yoke 18 is enlarged as at 35 and internally threaded to form a nut to receive the screwthreaded rod 31. Set screws 36 are threaded through the side walls of the frame extension and carry guide plates 72 at their inner ends to bear against the sides of the yoke to prevent the yoke tilting or rotating on the threaded rod 31. Lock nuts 37 maintain the guides in adjustment against the yoke. A hand wheel 38 is fixed to the end of the threaded rod 31 by means of which the rod may be rotated.

The gummer is so constructed that when it is placed upon a saw, a radial line ab from the axis of the saw to the point of contact of the gummer file with the base of the tooth will bisect the angle formed by the diverging arms 21 and 22 of the yoke, and a continuation of this line will coincide with the longitudinal axis of the threaded rod 31. Consequently, when the machine is placed upon a saw with the yoke bearing upon the space blocks, manipulation of the hand wheel will move the frame and the gummer file toward or away from the saw radially to the axis of the saw to seat the machine and determine the depth of cut of the file, maintaining the proper angular relationship between the gummer file and the saw teeth. Thus the machine may be adjusted to fit any saw cylinder regardless of differentials in diameter of saw and space block. The diverging arms of the yoke will automatically center themselves upon the circular space blocks and so correctly position the angularity of the gummer file with respect to the saw teeth. After the mahine has been placed upon the saw it may be locked in position by the swinging arm 39 through operation of the toggle mechanism 40.

Feed means to rotate the saw step by step to position the teeth in relation to the gummer file are shown at 41 and comprise a feed arm 42 having a floating pivotal connection 43 to the frame, and an actuating lever 44 pivoted to the frame at 45. One arm of the actuating lever carries a roller 46 which bears against the face cam 47 to rock the lever, and the other arm is connected to the feed arm 42 by the link 48. The cam 47 is fixed to a shaft 49 driven through suitable gearing from a motor 50. A spring 51 holds the roller 46 against the cam face and at the same time urges the feed arm forward into contact with the saw teeth, the floating connection between the feed arm and the frame permitting the feed arm to move back as the arm follows the curve of the saw.

Means similar to the above to advance the saw in timed relation with the lift of the gummer file out of engagement with the saw teeth is well known in the art and is disclosed in the aforementioned patents. Due to the fact that one or more teeth of the saw are often broken off thus rendering such feed means ineffective when the saw advances to a position where the feed should engage the teeth, the present invention provides an auxiliary feed to engage the saw at a point which is slightly removed from the point of engagement of the main feed to insure continuous step by step rotation of the saw. The auxiliary feed comprises a feed arm 52 pivotally attached to an extension of the pin 53 which secures the link 48 to the actuating lever 44. The auxiliary feed arm 52 is provided with an elongated opening to surround the pin 53 to permit a floating action of the feed arm, and the arm is normally urged downward by a spring 54 having one end attached to the arm and the other end secured to a spacer 55 on the pin 53. An adjusting screw and lock nut 56 limit the downward movement of the arm under the pull of the spring. At the upper end of the auxiliary feed arm is fastened a saw-engaging member 57 having its upper end bent at right angles to the feed arm to properly catch the saw teeth. The spring 54 keeps the auxiliary feed in engagement with the teeth of the saw. It will be seen that the actuating lever 44 operates both feed arms in synchronization and if one or more teeth of the saw should be missing, when that portion of the saw comes into the area of the main feed, the auxiliary feed will continue to advance the saw.

As is well known in the art, the gummer file is alternately lowered and raised to place the file into and out of grinding position with respect to successive saw teeth. This action is continuous as long as the machine is in operation. There are times, however, when it is desirable to raise the gummer file out of engagement with the saw and to lock it in this inoperative position. To accomplish this an eccentric 58 is provided fixed upon a shaft 59 passing through the frame 15. A handle 60 is secured to the shaft to rotate the eccentric. This structure is located directly under the mounting arm for the gummer file shaft and rotation of the eccentric will lift the gummer file and maintain it in this position.

Through suitable gearing the motor 50 drives the shaft 61 and through bevelled gears the shaft 62. A chain drive 63 and gears 64 provide means to rotate a set of rotary side files 65 which operate upon a saw which has been gummed to remove the bur which was left by the gummer file. These bur-removing files are so positioned upon the machine that they will engage an adjacent saw to the one being sharpened by the gummer file.

A crank pin 66 is fixed to the shaft 62, and by means of a pitman 68 imparts a reciprocating motion to a pair of bevelling side files 69. Files 69 are mounted upon a rod 70 slidable in bearings 71 fixed to the machine frame. These files are positioned so as to contact opposite faces of the saw adjacent to the one upon which the bur-removing files are working.

Due to this arrangement, the three operations, gumming, bur-removing, and bevelling, may be carried on simultaneously on adjacent saws, and in moving the machine from one saw to another proper adjustment of the gummer file will automatically position the other files.

What I claim is:

1. In a gin saw gumming machine of that type having a file for shaping the interdental spaces, and a frame adapted to be supported by space blocks between the saws, means for positioning and adjusting the gumming machine with reference to the saws comprising, a yoke having diverging bearing arms to engage said space blocks, said yoke having a threaded opening therethrough, a screwthreaded rod threaded through said opening and rotatably mounted in the frame at such an angle that a projection of its longitudinal axis will bisect the angle between the diverging arms of the yoke and intersect the point of contact between the file and the saw, whereby rotation of the screwthreaded rod will cause the frame to move radially to the saws and the file to move toward or away from the axis of the saws along the projected axis of the screwthreaded rod.

2. In a gin saw gumming machine of that type having a file for shaping the interdental spaces, and a frame adapted to be supported by space blocks between the saws using them as a base from which to maintain the file in a precise working position, a yoke having an inner end portion provided with diverging bearing arms to engage said space blocks and an arched outer end portion overhanging and extending outwardly beyond the file, a threaded nut carried by the outer extremity of the arched end portion of the yoke, a screwthreaded rod passing through said nut and rotatably mounted in the frame at such an angle that a projection of its longitudinal axis will pass through the point of contact of the file with the base of the tooth and bisect the angle between the diverging arms of the yoke, and means to rotate the threaded rod to move the frame toward or away from the diverging arms of the yoke to position the machine upon the saw and determine the depth of cut of the file.

3. In a gin saw gumming machine of that type having a file for shaping the interdental spaces, and a frame adapted to be supported by space blocks co-axial with and between the saws, means for positioning and adjusting the gumming machine with reference to the saws comprising, a yoke having diverging arms to engage said space blocks, adjusting means between the yoke and frame reciprocable along a line which bisects the angle between the diverging arms of the yoke and intersects the point of contact between the file and the saw, and means to move said adjusting means, whereby the frame may be caused to move radially to the saws and the file to move toward and away from the axis of the saws along the line of reciprocation of the adjusting means.

ERNEST W. BERNHARDT.